(12) United States Patent
Ozawa et al.

(10) Patent No.: US 10,970,870 B2
(45) Date of Patent: Apr. 6, 2021

(54) OBJECT DETECTION APPARATUS

(71) Applicant: Toyota Jidosha Kabushiki Kaisha, Toyota (JP)

(72) Inventors: Jun Ozawa, Machida (JP); Teppei Ohta, Susono (JP); Yoshitaka Oikawa, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/520,974

(22) Filed: Jul. 24, 2019

(65) Prior Publication Data

US 2020/0098126 A1    Mar. 26, 2020

(30) Foreign Application Priority Data

Sep. 21, 2018   (JP) .............................. JP2018-177528

(51) Int. Cl.
| | |
|---|---|
| *G06T 7/70* | (2017.01) |
| *G06K 9/00* | (2006.01) |
| *G06K 9/62* | (2006.01) |
| *G01S 13/86* | (2006.01) |

(52) U.S. Cl.
CPC .............. *G06T 7/70* (2017.01); *G01S 13/867* (2013.01); *G06K 9/00791* (2013.01); *G06K 9/6288* (2013.01); *G06K 2209/23* (2013.01); *G06T 2207/30236* (2013.01); *G06T 2207/30256* (2013.01)

(58) Field of Classification Search
CPC ........................................................ G06T 7/70
USPC ............................................................ 348/49
See application file for complete search history.

(56) References Cited

U.S. PATENT DOCUMENTS

| | | | |
|---|---|---|---|
| 2017/0307730 A1* | 10/2017 | Baba ....................... | G08G 1/166 |
| 2017/0309180 A1* | 10/2017 | Baba ...................... | G01S 13/867 |

FOREIGN PATENT DOCUMENTS

JP         2016-066182 A       4/2016

* cited by examiner

*Primary Examiner* — Eileen M Adams
*Assistant Examiner* — Daniel T Tekle
(74) *Attorney, Agent, or Firm* — Dinsmore & Shohl LLP

(57) ABSTRACT

An object detection apparatus includes: a camera; a map database; a radar sensor; and an electronic control unit configured to detect a first object in a camera image, detect a first relative position of the first object relative to the road structure in the camera image, detect a second object based on a result received by the radar sensor, detect a second relative angle and a relative distance between the host vehicle and the second object, estimate a second relative position of the second object relative to the road structure, determine, based on the first relative angle, the first relative position, the second relative angle, and the second relative position, whether the first and second objects belong to the same object, and recognize the first and second of as the same object, when it is determined that the first and second objects belong to the same object.

3 Claims, 6 Drawing Sheets

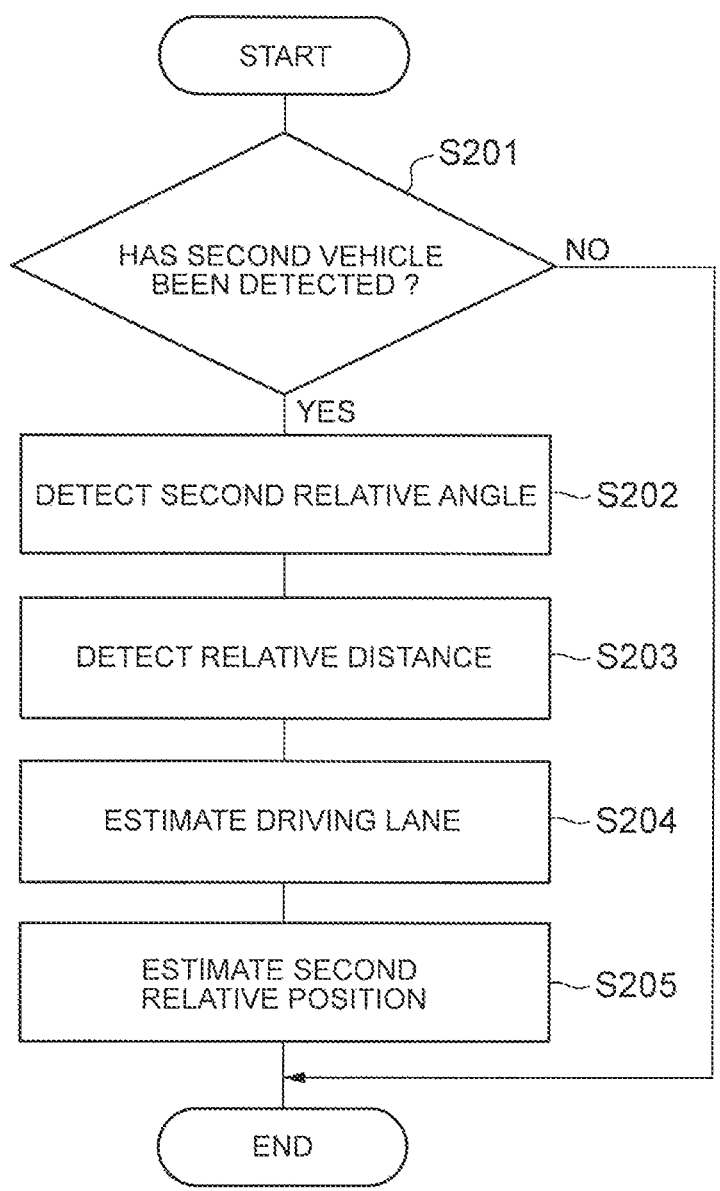

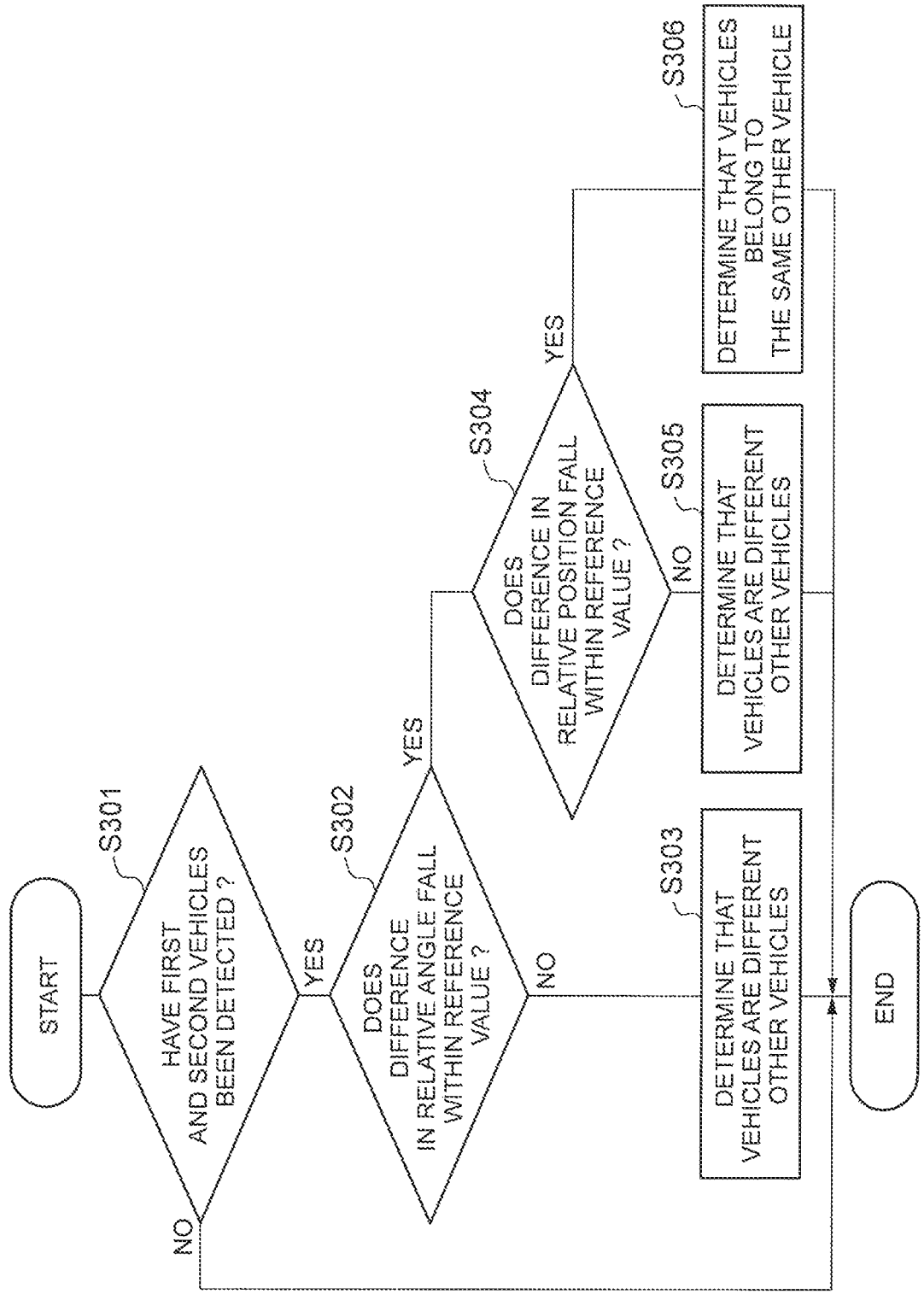

OBJECT DETECTION APPARATUS

CROSS-REFERENCE TO RELATED APPLICATIONS

This application claims priority to Japanese Patent Application No. 2018-177528 filed on Sep. 21, 2018, which is incorporated herein by reference in its entirety including the specification, drawings and abstract.

BACKGROUND

1. Technical Field

The disclosure relates to an object detection apparatus.

2. Description of Related Art

For example, Japanese Unexamined Patent Application Publication No. 2016-066182 (JP 2016-066182 A) describes an apparatus that detects an object based on a camera image around a host vehicle and that also detects an object based on a detection result of a radar sensor that detects an object around the host vehicle. The thus configured apparatus uses absolute position coordinates with respect to the host vehicle as an origin, compares the absolute position of the object detected based on the camera image with the absolute position of the object detected by the radar sensor, and then determines whether both objects belong to the same object.

SUMMARY

For example, a distortion or deformation of a camera image caused by, for example, the use of wide angle lens, the detection accuracy (distance accuracy) of the absolute position of an object based on a camera image can decrease. In this case, it is not possible to accurately determine whether an object detected based on a camera image and an object detected by the radar sensor belong to the same object.

An aspect of the disclosure provides an object detection apparatus. The object detection apparatus includes: a camera configured to capture an image around a host vehicle; a map database storing map information that contains a position of a road structure on a map; a radar sensor configured to irradiate radio waves or light to an area around the host vehicle and receive reflected waves of the radio waves or the light; and an electronic control unit configured to detect a first object in a camera image based on the camera image captured by the camera, detect a first relative angle indicating a direction in which the first object is present from the host vehicle and a first relative position that is a position of the first object relative to the road structure in the camera image, recognize a position of die host vehicle on the map, detect a second object around the host vehicle based on a result received by the radar sensor, detect a second relative angle indicating a direction in which the second object is present from the host vehicle and a relative distance between the host vehicle and the second object, estimate, based on the position of the road structure on the map, the position of the host vehicle on the map, the second relative angle, and the relative distance, a second relative position that is a position of the second object relative to the road structure, determine, based on the first relative angle, the first relative position, the second relative angle, and the second relative position, whether the first object and the second object belong to the same object, and recognize the first object and the second object as the same object, when it is determined that the first object and the second object belong to die same object.

With this configuration, even when the detection accuracy (distance accuracy) of the absolute position of the first object based on the camera image is low, the object detection apparatus is able to determine whether the first object and the second object belong to the same object by using the first relative position and the second relative position that are positions relative to the road structure or by using other information. In this way, the object detection apparatus is able to accurately determine whether the object (first object) detected based on the camera image and the object (second object) detected by the radar sensor belong to the same object.

In the above aspect, the electronic control unit may be configured to, when a difference between the first relative angle and the second relative angle falls within a predetermined reference value of a relative angle, determine that the first object and the second object belong to the same object. In this case, the object detection apparatus is able to determine whether the first object and the second object belong to the same object based on whether the difference between the first relative angle and the second relative angle falls within the relative angle reference value.

In the above aspect, the electronic control unit may be configured to, when a difference between the first relative position and the second relative position falls within a predetermined reference value of a relative position, determine that the first object and the second object belong to the same object. In this case, the object detection apparatus is able to determine whether the first object and the second object belong to the same object based on whether the difference between the first relative position and the second relative position falls within the relative position reference value.

According to the aspect of the disclosure, it is possible to accurately determine whether the object detected based on the camera image and the object detected by the radar sensor belong to the same object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart showing the flow of a process of detecting a second relative angle of the second vehicle, which is executed by a second object detection unit, and a process of estimating a second relative position of the second vehicle, which is executed by a second object position estimation unit; and FIG. 6 is a flowchart showing the flow of a process of recognizing an object, which is executed by an object recognition unit.

DETAILED DESCRIPTION OF EMBODIMENTS

Figure 1:
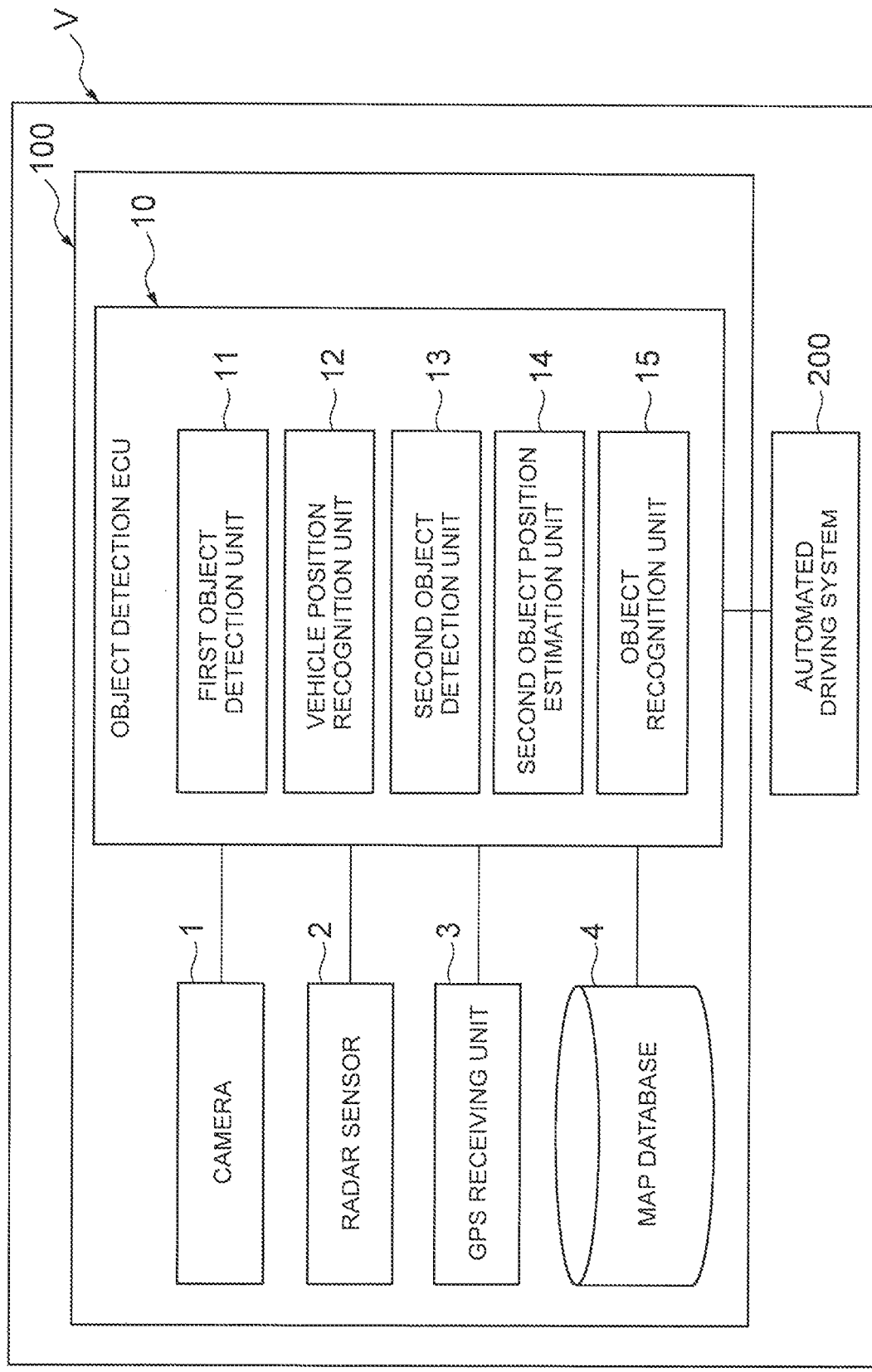
FIG. 1 is a block diagram showing the schematic configuration of an object detection apparatus according to an embodiment.

Hereinafter, an embodiment of the disclosure will be described with reference to the accompanying drawings. Like reference numerals denote the same elements in the description of the drawings, and the description thereof will not be repeated.

As shown in FIG. 1, an object detection apparatus 100 is mounted on a host vehicle V, such as a passenger vehicle that is able to perform automated driving. The object detection apparatus 100 detects an object around the host vehicle V. Automated driving is vehicle control to cause the host vehicle V to travel automatically along a target route set in advance. In automated driving, a driver does not need to perform driving operation, and the host vehicle V automatically travels. Examples of an object around the host vehicle V to be detected by the object detection apparatus 100 include other vehicles, pedestrians, and fixed obstacles around the host vehicle V. In the following description, the case in which the object detection apparatus 100 detects other vehicles around the host vehicle V is taken as an example.

The object detection apparatus 100 includes a camera 1, a radar sensor 2, a GPS receiving unit 3, a map database 4, and an object detection ECU 10. The object detection ECU 10 generally controls the apparatus. The camera 1, the radar sensor 2, the GPS receiving unit 3, and the map database 4 are connected to the object detection ECU 10.

The object detection electronic control unit (ECU) 10 is an electronic control unit including a central processing unit (CPU), a read only memory (ROM), a random access memory (RAM), and other components. In the object detection ECU 10, various functions are implemented by, for example, loading programs stored in the ROM onto the RAM and executing the programs loaded on the RAM on the CPU. The object detection ECU 10 may be made up of a plurality of electronic control units. Part of the functions of the object detection ECU 10, which will be described below, may be executed in a computer of a facility such as an information management center that is able to communicate with the host vehicle V.

The camera 1 is an image capturing device that captures an image of an outside environment around the host vehicle V. The camera 1 is provided so as to be able to capture an image around the host vehicle V. The camera 1 transmits a captured camera image to the object detection ECU 10. The camera 1 may be made up of a plurality of cameras so as to be able to capture images around the host vehicle V. The type of the camera 1 is not specifically limited as long as the camera 1 is able to capture an image around the host vehicle V.

The radar sensor 2 is a detector that detects an obstacle around the host vehicle V by using radio waves (for example, millimeter waves) or light. Examples of the radar sensor 2 include millimeter wave radar or light detection and ranging (LIDAR). The radar sensor 2 detects an object by irradiating radio waves or light to an area around the host vehicle V and receiving reflected waves of the irradiated radio waves or light. The radar sensor 2 transmits received radio waves or light to the object detection ECU 10. Objects to be detected by the radar sensor 2 include not only fixed obstacles, such as guard rails and buildings, but also moving obstacles, such as pedestrians, bicycles, and other vehicles.

The GPS receiving unit 3 measures the position of the host vehicle V (for example, the latitude and longitude of the host vehicle V) based on signals received from three or more GPS satellites. The GPS receiving unit 3 transmits the measured position information of the host vehicle V to the object detection ECU 10.

The map database 4 is a database that stores map information. The map database 4 is constructed in, for example, a hard disk drive (HDD) mounted on the host vehicle V. The map information contains road (lane) position information (positions on a map), road shape (lane shape) information (for example, types such as a curve and a straight section, the curvature of a curve, or the like), road structure position information, and other information. The map database 4 may be stored in a server that is able to communicate with the host vehicle V. Road structures are objects on roads, and include lanes on roads, traffic lane lines (such as white lines) that separate lanes, guard rails, and other objects. Lanes on roads can be determined based on traffic lane line position information.

The object detection ECU 10 functionally includes a first object detection unit 11, a vehicle position recognition unit 12, a second object detection unit 13, a second object position estimation unit 14, and an object recognition unit 15.

Based on a camera image captured by the camera 1, the first object detection unit 11 detects another vehicle (first object) in the camera image. Hereinafter, another vehicle that is detected by the first object detection unit 11 based on a camera image is referred to as first vehicle. The first object detection unit 11 also detects a first relative angle and a first relative position based on the camera image. The first relative angle indicates a direction in which the first vehicle is present from the host vehicle V. The first relative position is a position of the first vehicle relative to a road structure in the camera image.

The first object detection unit 11 is able to detect a first vehicle based on a camera image by using a known image processing technique or other techniques. The first object detection unit 11 may detect a first vehicle V1 by, for example, image pattern matching. The first object detection unit 11 is able to detect a first relative angle and a first relative position based on a camera image, an orientation in which the camera 1 is placed, and the like, by using a known image processing technique or other techniques.

Figure 2:
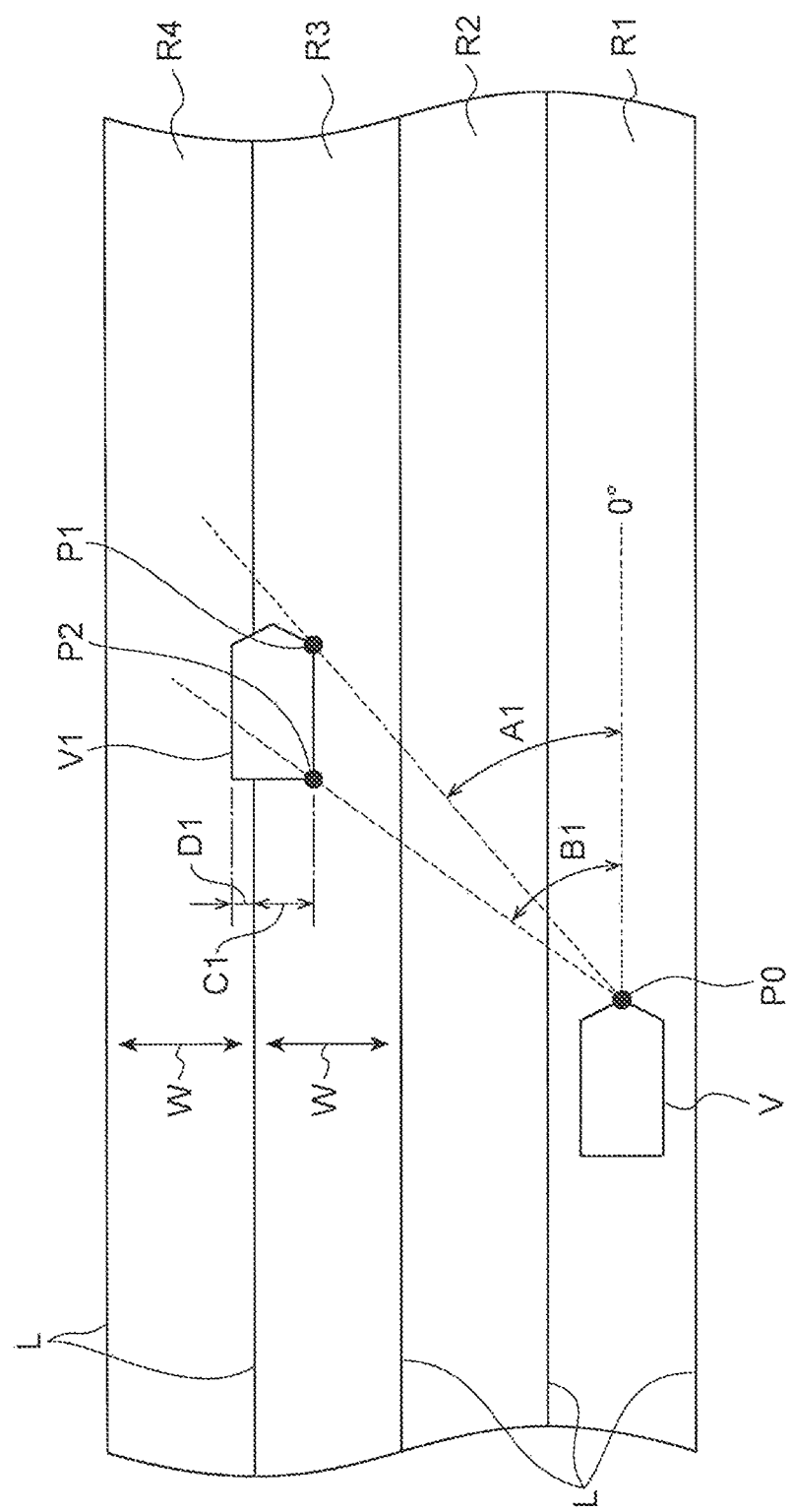
FIG. 2 is a schematic plan view showing a positional relationship between a host vehicle and a first vehicle detected based on a camera image.

A specific example of detection of a first relative angle and a first relative position will be described. For example, it is assumed that, as shown in FIG. 2, the first object detection unit 11 has detected a first vehicle V1 in front of and to the left of the host vehicle V based on a camera image. It is assumed that a lane on which the host vehicle V travels is a lane R1 and lanes R2, R3, R4 are arranged next to the lane R1 in order from the lane R1 toward the left side. It is assumed that the first vehicle V1 is traveling at a position over a traffic lane line L that separates the lane R3 and the lane R4.

The first object detection unit 11 detects the first relative angle of the first vehicle V1 relative to the host vehicle V based on the camera image. As an example, in the present embodiment, the first object detection unit 11 detects a direction in which the first vehicle V1 is present when viewed from an origin P0 set at the center position of the front end of the host vehicle V as the first relative angle, as shown in FIG. 2. As an example, in the present embodiment, the first object detection unit 11 detects an angular range in which the first vehicle V1 is present as the first relative angle where a direction from the origin P0 forward of the host vehicle is 0°. As an example, in the present embodiment, the first object detection unit 11 detects angles A1 [°] to B1 [°] including a right-side corner P1 of the front end of the first vehicle V1 and a right-side corner P2 of a rear end of the first vehicle V1 as the first relative angle of the first vehicle V1, as shown in FIG. 2.

The above-described method of detecting a first relative angle is one example. For example, the origin P0 for detecting a first relative angle is not limited to the center position of the front end of the host vehicle V, and may be another predetermined position, such as a center position (center position in a front and rear direction and in a right and left direction) of the host vehicle V and a position at which the camera 1 is mounted. A direction other than the direction from the origin P0 ahead of the host vehicle may be set to 0°. The first object detection unit 11 may detect an angular range including the right-side corner to left-side corner of the front end of the host vehicle V or an angular range including the right-side corner to left-side corner of the rear end, as the first relative angle indicating the direction in which the first vehicle V1 is present. The first relative angle that the first object detection unit 11 uses is not limited to an angular range in which the first vehicle V1 is present. For example, the first object detection unit 11 may detect a direction passing through a predetermined position, such as the center position (center in the front and rear direction and in the right and left direction) of the first vehicle V1 when viewed from the origin P0, as the first relative angle. In this way, when the first object detection unit 11 may employ various known specification methods as the first relative angle as long as the first relative angle can indicate the direction in which the first vehicle V1 is present from the host vehicle V.

Subsequently, the first object detection unit 11 detects a first relative position based on the camera image. The first relative position is a position of the first vehicle V1 relative to a road structure in the camera image. Specifically, the first object detection unit 11 uses an object present near the first vehicle V1 in the camera image as the road structure. In the present embodiment, the first object detection unit 11 uses lanes of a road as the road structures. The first object detection unit 11 uses lanes that the first vehicle V1 overlap among lanes around the first vehicle V1, as the lanes to be used as the road structures. The first object detection unit 11 is able to detect traffic lane lines L contained in the camera image by a known image processing technique or other techniques, and detect the lanes R3, R4 that the first vehicle V1 overlaps based on the traffic lane lines L in the camera image and the position of the first vehicle V1. As shown in FIG. 2, a portion including the right edge of the first vehicle V1 overlaps the lane R3, and a portion including the left edge of the first vehicle V1 overlaps the lane R4.

The first object detection unit 11 uses die overlap rate of the first vehicle V1 that overlaps each of the lanes R3, R4 detected as the road structures, as the first relative position. For example, the overlap rate on the lane R3 is the percentage by which the first vehicle V1 overlaps the lane R3 in a lane width direction. That is, the overlap rate on the lane R3 is, where the lane width W of the lane R3 is 100%, the percentage by which the first vehicle V1 occupies the lane R3 in the lane width direction. The first object detection unit 11 detects the overlap rate C1 [%] of the first vehicle V1 on the lane R3 and the overlap rate D1 [%] of the first vehicle V1 on the lane R4 as shown in FIG. 2 based on the camera image. The first object detection unit 11 is able to detect the overlap rates based on the traffic lane lines L in the camera image and the position of the first vehicle V1.

An overlap rate to be used as the first relative position is associated with information that identifies the overlap rate on which lane. That is, in the example shown in FIG. 2, information that that identifies the overlap rate on the lane R3 is associated with the overlap rate C1 [%], and information that identifies the overlap rate on the lane R4 is associated with the overlap rate D1 [%].

The vehicle position recognition unit 12 recognizes a position of the host vehicle V on the map based on the position information of the GPS receiving unit 3 and the map information of the map database 4. The vehicle position recognition unit 12 recognizes the position of the host vehicle V by simultaneous localization and mapping (SLAM) technique by using the position information of a fixed obstacle, such as a utility pole, contained in the map information of the map database 4 and a detection result of an exterior sensor that detects an outside environment around the host vehicle V. The vehicle position recognition unit 12 may recognize the position of the host vehicle V on the map by other known techniques.

The second object detection unit 13 detects another vehicle (second object) around the host vehicle V based on a result received by the radar sensor 2. Hereinafter, another vehicle that is detected by the second object detection unit 13 based on a result received by the radar sensor 2 is referred to as second vehicle. The second object detection unit 13 detects a second relative angle and a relative distance between the host vehicle V and the second vehicle based on a result received by the radar sensor 2. The second relative angle indicates a direction in which the second vehicle is present from the host vehicle V.

The second object detection unit 13 is able to detect a second vehicle based on a result received by the radar sensor 2 by using a known method. The second object detection unit 13 is able to detect a second relative angle and a relative distance by using a known method based on a direction in which radio waves, or the like, are irradiated, time that is taken from irradiation of radio waves, or the like, until reflected waves are received, and the like.

Figure 3:
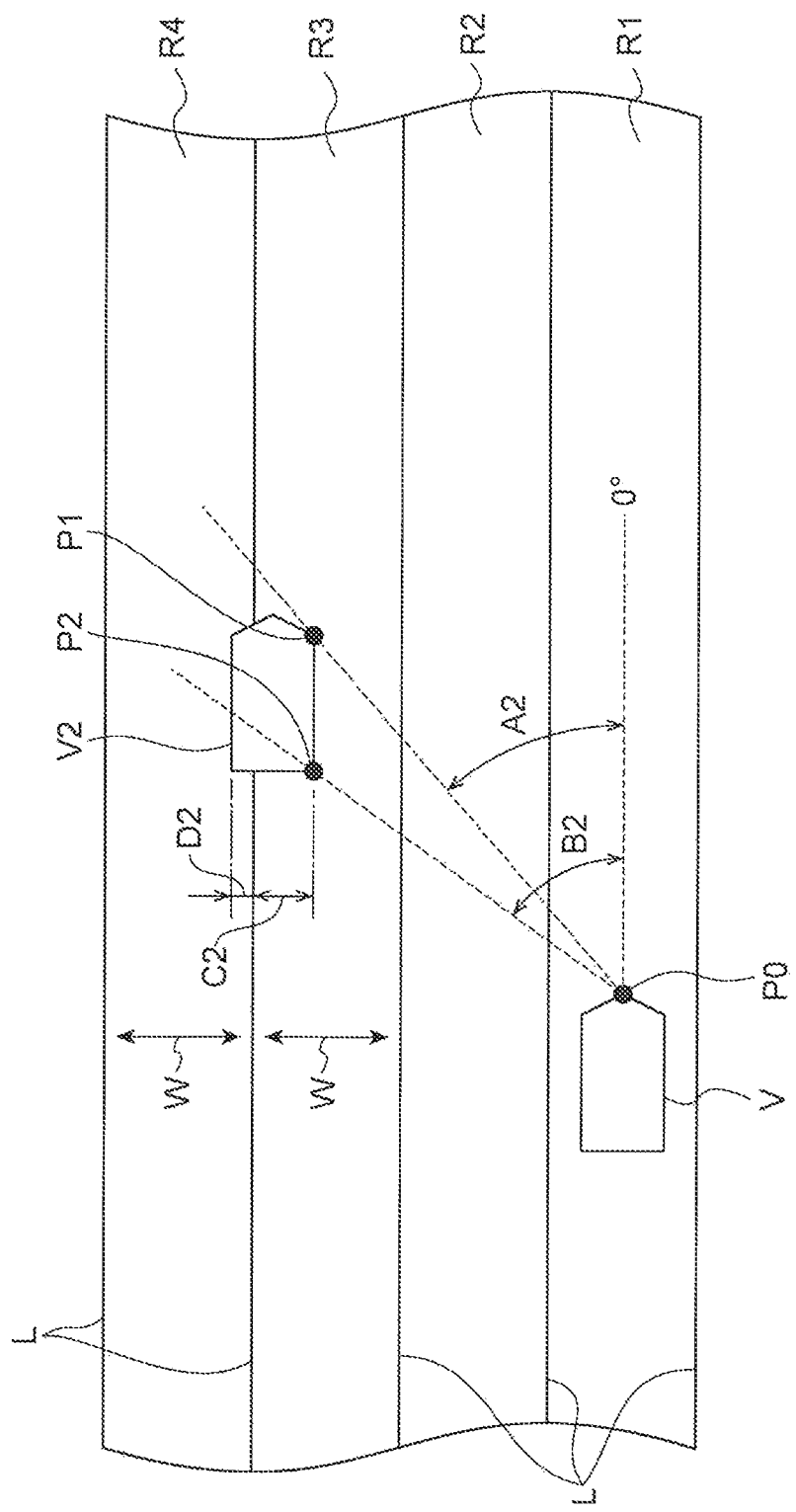
FIG. 3 is a schematic plan view showing a positional relationship between the host vehicle and a second vehicle detected by a radar sensor.

A specific example of detection of a second relative angle will be described. For example, it is assumed that, as shown in FIG. 3, the second object detection unit 13 has detected a second vehicle V2 that travels in front of and to the left of the host vehicle V based on a result received by the radar sensor 2. It is assumed that the lane on which the host vehicle V travels is the lane R1 and the lanes R2, R3, R4 are arranged next to the lane R1 in order from the lane R1 toward the left side. It is assumed that the second vehicle V2 is traveling at a position over a traffic lane line L that separates the lane R3 and the lane R4.

The second object detection unit 13 detects a second relative angle of the second vehicle V2 relative to the host vehicle V based on the result received by the radar sensor 2. The second object detection unit 13, as in the case of the first relative angle, detects angles A2[°] to B2[°] including the right-side corner P1 of the front end of the second vehicle V2 and the right-side corner P2 of the rear end, as the second relative angle of the second vehicle V2, as shown in FIG. 3. The object recognition unit 15 compares the first relative angle with the second relative angle. Therefore, the second object detection unit 13 just needs to detect a second relative angle by using the same angle specification method as the first relative angle so that the second relative angle can be compared with the first relative angle.

The second object position estimation unit 14 estimates a second relative position based on the position of a road structure on the map, contained in the map information, the position of the host vehicle V on the map, recognized by the vehicle position recognition unit 12, and the second relative angle and relative distance detected by the second object detection unit 13. The second relative position is a position of the second vehicle V2 relative to the road structure.

The second object position estimation unit 14, as in the case of the first relative position, uses lanes as the road structures. The second object position estimation unit 14 uses lanes that the second vehicle V2 overlaps among lanes around the second vehicle V2, as the lanes to be used as the road structures. The second object position estimation unit 14, as in the case of the first relative position, uses the overlap rate of the second vehicle V2 that overlaps each of the lanes to be used as the road structures, as the second relative position.

An overlap rate that is used as the second relative position, as well as the overlap rate of the first relative position, is associated with information that determines the overlap rate on which lane.

Specifically, as shown in FIG. 3, the second object position estimation unit 14 estimates a positional relation of the second vehicle V2 relative to the lanes based on the position information of the traffic lane lines L, contained in the map information, the position of the host vehicle V on the map, and the second relative angle and relative distance of the second vehicle V2, detected by the second object detection unit 13. The second object position estimation unit 14 estimates the lanes R3, R4 that the second vehicle V2 overlaps.

The second object position estimation unit 14 estimates the overlap rate C2[%] of the second vehicle V2 on the estimated lane R3 and the overlap rate D2[%] of the second vehicle V2 on the estimated lane R4 as the second relative position. The second object position estimation unit 14 is able to estimate the overlap rates by using the position information of the estimated lanes R3, R4 (the position information of the traffic lane lines L), the position of the host vehicle V on the map, and the second relative angle and relative distance of the second vehicle V2, detected by the second object detection unit 13, based on the positional relation among various portions.

The object recognition unit 15 recognizes another vehicle around the host vehicle V based on the first vehicle V1 detected by the first object detection unit 11 and the second vehicle V2 detected by the second object detection unit 13. The object recognition unit 15 determines whether the first vehicle V1 and the second vehicle V2 belong to the same object. When the object recognition unit 15 determines that the first vehicle V1 and the second vehicle V2 belong to the same object, the object recognition unit 15 recognizes the first vehicle V1 and the second vehicle V2 as the same other vehicle (the same object). When the object recognition unit 15 determines that the first vehicle V1 and the second vehicle V2 are not the same, the object recognition unit 15 recognizes the first vehicle V1 and the second vehicle V2 as different other vehicles.

Hereinafter, the above determination will be described. The object recognition unit 15 determines whether the first vehicle V1 and the second vehicle V2 belong to the same object based on the first relative angle and first relative position of the first vehicle V1 and the second relative angle and second relative position of the second vehicle V2.

The object recognition unit 15 may determine that the first vehicle V1 and the second vehicle V2 belong to the same object when the difference between the first relative angle and the second relative angle falls within a predetermined relative angle reference value. For example, when an angular range is used to indicate the first relative angle and the second relative angle, the object recognition unit 15 may use the amount of deviation between the angular ranges (range in which the two angular ranges do not overlap) as the difference between the first relative angle and the second relative angle. The difference between the first relative angle and the second relative angle is not limited to this, and the object recognition unit 15 may use the difference between a median of the angular range of the first relative angle and a median of the angular range of the second relative angle as the difference between the first relative angle and the second relative angle. In this way, even when the angular range is used to indicate the first relative angle and the second relative angle, the object recognition unit 15 is able to use various specification methods as the difference between the first relative angle and the second relative angle as long as the difference between the first relative angle and the second relative angle is expressed.

The object recognition unit 15 may determine that the first vehicle V1 and the second vehicle V2 belong to the same object when the difference between the first relative position and the second relative position falls within a predetermined relative position reference value. The object recognition unit 15 determines that the first vehicle V1 and the second vehicle V2 belong to the same object when the difference between the overlap rate indicating the first relative position and the overlap rate indicating the second relative position falls within the relative position reference value.

As an example, the object recognition unit 15 may use the overlap rate on a lane that the first vehicle V1 overlaps the most as the first relative position. Similarly, the object recognition unit 15 may use the overlap rate on a lane that the second vehicle V2 overlaps the most as the second relative position. For example, in the example shown in FIG. 2 and FIG. 3, the overlap rates C1, C2 on the lane R3 are used as the first relative position and the second relative position. In this case, the object recognition unit 15 may determine whether the first vehicle V1 and the second vehicle V2 belong to the same object based on whether the difference between the overlap rates C1, C2 falls within the relative position reference value. When the object recognition unit 15 uses the overlap rate on the lane that the first vehicle V1 overlaps the most and the overlap rate on the lane that the second vehicle V2 overlaps the most, the object recognition unit 15 may determine that the first vehicle V1 and the second vehicle V2 are not the same when die lane that the first vehicle V1 overlaps the most and the lane that the second vehicle V2 overlaps the most are different lanes.

As described above, the first and second relative positions that the object recognition unit 15 uses are not limited to the overlap rates on the lanes that the first and second vehicles V1, V2 respectively overlap the most. For example, the object recognition unit 15 may determine whether the first vehicle V1 and the second vehicle V2 belong to the same object based on the overlap rate of each of a plurality of lanes that the first vehicle V1 overlaps and the overlap rate of each of a plurality of lanes that the second vehicle V2 overlaps.

An automated driving system 200 is mounted on the host vehicle V. The automated driving system 200 executes automated driving control over the host vehicle V based on an instruction, or the like, to start automated driving, issued by a driver of the host vehicle V. The automated driving system 200 executes automated driving control by using a detection result for an object around the host vehicle V, detected by the object detection apparatus 100. The automated driving system 200 is able to execute automated driving control over the host vehicle V by using a known method.

Figure 4:
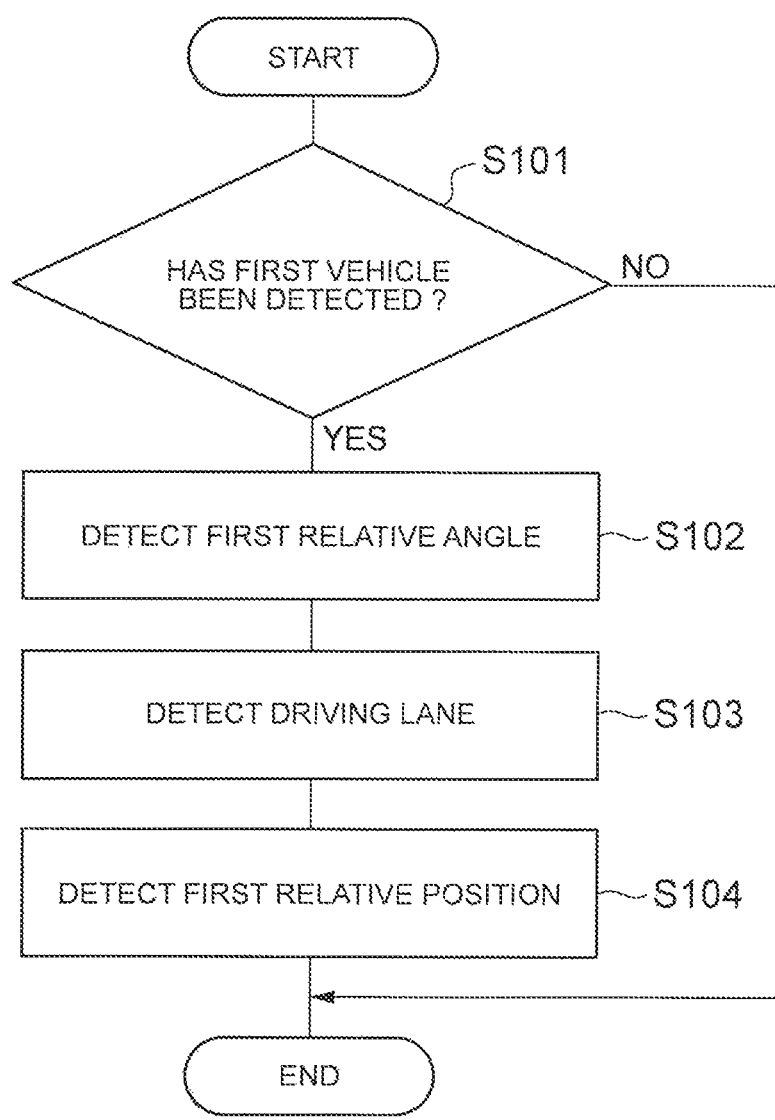
FIG. 4 is a flowchart showing the flow of a process of detecting a first relative angle and first relative position of the first vehicle, which is executed by a first object detection unit.

Next, the flow of an object detection process that is executed by the object detection apparatus 100 will be described. First, the flow of a process of detecting a first relative angle and first relative position of the first vehicle, which is executed by the first object detection unit 11, will be described with reference to FIG. 4. The process shown in FIG. 4 is, for example, started as the status of the host vehicle V becomes a travel start state. In addition, the process shown in FIG. 4 is, for example, initiated again from START after a lapse of predetermined time from when the process has reached END.

As shown in FIG. 4, the first object detection unit 11 acquires a camera image from the camera 1, and executes the process of detecting a first vehicle based on the acquired camera image (S101). When no first vehicle has been detected (NO in S101), the first object detection unit 11 terminates the current process, and initiates the process again from START after a lapse of predetermined time.

When the first vehicle has been detected (YES in S101), the first object detection unit 11 detects a first relative angle indicating a direction in which the first vehicle is present from the host vehicle V based on the camera image (S102). The first object detection unit 11 detects lanes on which the first vehicle travels as road structures based on the camera image (S103). The first object detection unit 11 detects the overlap rates of the first vehicle on the lanes detected as the road structures as a first relative position based on the camera image (S104).

Execution of the process of step S102 and the processes of step S103 and step S104 is not limited to the order shown in FIG. 4. The processes may be executed in the reverse order to the order shown in FIG. 4 or may be executed at the same time.

Next, the flow of the process of detecting a second relative angle of a second vehicle, which is executed by the second object detection unit 13, and the process of estimating a second relative position of the second vehicle, which is executed by the second object position estimation unit 14, will be described with reference to FIG. 5. The process shown in FIG. 5 is, for example, initiated as the status of the host vehicle V becomes a travel start state. In addition, the process shown in FIG. 5 is, for example, initiated again from START after a lapse of predetermined time from when the process has reached END.

As shown in FIG. 5, the second object detection unit 13 acquires a result received by the radar sensor 2 and executes the process of detecting a second vehicle based on the acquired result (S201). When no second vehicle is detected (NO in S201), the second object detection unit 13 terminates the current process and initiates the process again from START after a lapse of predetermined time.

When the second vehicle has been detected (YES in S201), the second object detection unit 13 detects a second relative angle indicating a direction in which the second vehicle is present from the host vehicle V based on the result received by the radar sensor 2 (S202). The second object detection unit 13 detects a relative distance between the host vehicle V and the second vehicle based on the result received by the radar sensor 2 (S203).

The second object position estimation unit 14 estimates lanes on which the second vehicle travels as road structures based on position information of traffic lane lines L, contained in the map information or other information (S204). The second object position estimation unit 14 estimates the overlap rates of the second vehicle on the lanes estimated as the road structures as a second relative position based on the position information of the traffic lane lines L, contained in the map information (S205).

Execution of the process of step S202 and the process of step S203 is not limited to the order shown in FIG. 5. The processes may be executed in the reverse order to the order shown in FIG. 5 or may be executed at the same time.

Next, the flow of an object recognition process that is executed by the object recognition unit 15 will be described with reference to FIG. 6. The process shown in FIG. 6 is, for example, initiated as an image capturing process in the camera 1 and a detection process in the radar sensor 2 are initiated. In addition, the process shown in FIG. 6 is, for example, initiated again from START after a lapse of predetermined time from when the process has reached END.

The object recognition unit 15 acquires a detection result for a first vehicle in the first object detection unit 11 and a detection result for a second vehicle in the second object detection unit 13. For example, the latest detection results are acquired from among detection results that are repeatedly acquired in the first object detection unit 11 and the second object detection unit 13. The object recognition unit 15 determines whether a first vehicle and a second vehicle have been detected based on the acquired detection results (S301). When both the first vehicle and the second vehicle are not detected or only any one of the first vehicle and the second vehicle has been detected (NO in S301), the object recognition unit 15 terminates the current process and initiates the process again from START after a lapse of predetermined time.

When both the first vehicle and the second vehicle have been detected (YES in S301), the object recognition unit 15 determines whether the difference between the first relative angle detected by the first object detection unit 11 and the second relative angle detected by the second object detection unit 13 falls within the predetermined relative angle reference value (S302). When the difference in relative angle does not fall within the relative angle reference value (NO in S302), the object recognition unit 15 determines that the first vehicle and the second vehicle are not the same, and recognizes the first vehicle and the second vehicle as different other vehicles (S303).

When the difference in relative angle falls within the relative angle reference value (YES in S302), the object recognition unit 15 determines whether the difference in overlap rate between the first relative position detected by the first object detection unit 11 and the second relative position estimated by the second object position estimation unit 14 falls within the predetermined relative position reference value (S304). When the difference in relative position (overlap rate) does not fall within the relative position reference value (NO in S304), the object recognition unit 15 determines that the first vehicle and the second vehicle are not the same, and recognizes the first vehicle and the second vehicle as different other vehicles (S305).

When the difference in relative position (overlap rate) falls within the relative position reference value (YES in S304), the object recognition unit 15 determines that the first vehicle and the second vehicle belong to the same object, and recognizes the first vehicle and the second vehicle as the same other vehicle (S306).

As described above, in the object detection apparatus 100, of the first vehicle detected based on a camera image, a first relative angle indicating a direction in which the first vehicle is present and a first relative position of the first vehicle relative to a road structure (lane) are detected. In addition, of the second vehicle that is detected based on a result received by the radar sensor 2, a second relative angle indicating a direction in which the second vehicle is present is detected, and a second relative position of the second vehicle relative to a load structure (lane) is estimated based on the map information or other information. Then, the object detection apparatus 100 determines whether the first vehicle and the second vehicle belong to the same object based on the first relative angle and first relative position of the first vehicle and the second relative angle and second relative position of the second vehicle. Thus, even when the detection accuracy (distance accuracy) of the absolute position of the first vehicle based on the camera image is low, the object detection apparatus 100 is able to determine whether the first vehicle and the second vehicle belong to the same object by using, for example, the first relative position and the second relative position that are positions relative to the road structure or by using oilier information. In this way, the object detection apparatus 100 is able to accurately determine whether the first vehicle detected based on the camera image and the second vehicle detected by the radar sensor 2 belong to the same object.

The object detection apparatus 100 is also able to determine whether the first vehicle and the second vehicle belong to the same object based on whether the difference between the first relative angle and the second relative angle falls within the relative angle reference value. Similarly, the object detection apparatus 100 is able to determine whether the first vehicle and the second vehicle belong to the same object based on whether the difference in overlap rate between the first relative position and the second relative position fails within the relative position reference value.

The embodiment of the disclosure is described above; however, the disclosure is not limited to the above-described embodiment. The case where lanes are used as road structures, for example, when a first relative position is detected and a second relative position is recognized is described as an example. Instead, an object other than lanes may be used as a road structure. For example, a guard rail on a road, a side wall at a roadside or the like, a road surface paint, or other objects, may be used as the road structures.

For example, the position information of the road structures is not limited to that stored in the map database 4 in advance as the map information. For example, the object detection apparatus 100 may detect the position information of a road structure based on a camera image of the camera 1, or the like, and may store the detected position information of the road structure in the map database 4 as the map information. In this case, for example, the object detection apparatus 100 links a plurality of camera images captured in the past depending on the behavior of the host vehicle V, and recognizes a road structure, such as a white line. Examples of the behavior of the host vehicle V can include a yaw rate of the host vehicle V, detected by a yaw rate sensor, and a vehicle speed of the host vehicle V, detected by a vehicle speed sensor. The object detection apparatus 100 may detect the position of a road structure, such as a white line, on the map based on the position of the host vehicle V on the map, recognized by the vehicle position recognition unit 12. The position information of a road structure, detected in this way, may be used when the second object position estimation unit 14 estimates a second relative position of the second vehicle.

For example, the first relative position and the second relative position each are not limited to overlap rates on lanes. For example, the first object detection unit 11 may detect a position of the first vehicle (for example, the center position of the first vehicle in the vehicle width direction) in a lane on which the first vehicle travels, as the first relative position. That is, the first object detection unit 11 may detect a position of the first vehicle relative to the lane (road structure) on which the first vehicle travels, as the first relative position. Similarly, the second object position estimation unit 14 may recognize a position of the second vehicle (for example, the center position of the second vehicle in the vehicle width direction) in a lane on which the second vehicle travels, as the second relative position. That is, the second object position estimation unit 14 may estimate a position of the second vehicle relative to the lane (road structure) on which the second vehicle travels, as the second relative position. In this case, the object recognition unit 15 may determine that the first vehicle and the second vehicle belong to the same object when the difference between the position of the first vehicle in the lane, detected as the first relative position, and the position of the second vehicle in the lane, detected as the second relative position, falls within a predetermined reference value, instead of the above-described overlap rates.

As another example, the object recognition unit 15 may determine that the first vehicle and the second vehicle belong to the same object based on the absolute positions of the first vehicle and second vehicle and the above-described positions of the first vehicle and second vehicle in the driving lanes. In this case, the first object detection unit 11 just needs to detect the absolute position of the first vehicle by using a known method based on a camera image. Similarly, the second object detection unit 13 just needs to detect the absolute position of the second vehicle by using a known method based on a result received by the radar sensor 2.

The use of a detection result of the object detection apparatus 100 for an object around the host vehicle V is not limited to the use in the automated driving system 200. A detection result of the object detection apparatus 100 may be used in other applications, such as drive assist for the host vehicle V.

What is claimed is:
1. An object detection apparatus comprising:
a camera configured to capture an image around a host vehicle;
a map database storing map information that contains a position of a road structure on a map, the road structure comprises one or more lanes of a road;
a radar sensor configured to irradiate radio waves or light to an area around the host vehicle and receive reflected waves of the radio waves or the light; and
an electronic control unit configured to
detect a first object in a camera image based on the camera image captured by the camera,
detect a first relative angle indicating a direction in which the first object is present from the host vehicle and a first relative position that is a position of the first object relative to the road structure in the camera image, the first relative position comprises an overlap rate of the first object comprising a percentage by which the first object overlaps the one or more lanes of the road,
recognize a position of the host vehicle on the map,
detect a second object around the host vehicle based on a result received by the radar sensor,
detect a second relative angle indicating a direction in which the second object is present from the host vehicle and a relative distance between the host vehicle and the second object, estimate, based on the position of the road structure on the map, the position of the host vehicle on the map, the second relative angle, and the relative distance, a second relative position that is a position of the second object relative to the road structure, the second relative position comprises an overlap rate of the second object comprising a percentage by which the second object overlaps the one or more lanes of the road, determine, based on the first relative angle, the first relative position, the second relative angle, and the second relative position, whether the first object and the second object belong to the same object, and recognize the first object and the second object as the same object, when it is determined that the first object and the second object belong to the same object.

2. The object detection apparatus according to claim 1, wherein the electronic control unit is configured to, when a difference between the first relative angle and the second relative angle falls within a predetermined reference value of a relative angle, determine that the first object and the second object belong to the same object.

3. The object detection apparatus according to claim 1, wherein the electronic control unit is configured to, when a difference between the first relative position and the second relative position falls within a predetermined reference value of a relative position, determine that the first object and the second object belong to the same object.

* * * * *

UNITED STATES PATENT AND TRADEMARK OFFICE
CERTIFICATE OF CORRECTION

PATENT NO. : 10,970,870 B2  
APPLICATION NO. : 16/520974  
DATED : April 6, 2021  
INVENTOR(S) : Jun Ozawa, Teppei Ohta and Yoshitaka Oikawa Page 1 of 1

It is certified that error appears in the above-identified patent and that said Letters Patent is hereby corrected as shown below:

On the Title Page

Item (57), abstract, Line(s) 13, after "second", delete "of" and insert --objects--, therefor.

In the Specification

In Column 1, Line(s) 54, delete "die" and insert --the--, therefor.

In Column 2, Line(s) 2, delete "die" and insert --the--, therefor.

In Column 5, Line(s) 53, delete "die" and insert --the--, therefor.

In Column 8, Line(s) 47, delete "die" and insert --the--, therefor.

In Column 11, Line(s) 5, delete "load" and insert --road--, therefor.

In Column 11, Line(s) 18, delete "oilier" and insert --other--, therefor.

In Column 11, Line(s) 32, delete "fails" and insert --falls--, therefor.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*